(12) United States Patent
Donkai et al.

(10) Patent No.: US 9,789,743 B2
(45) Date of Patent: Oct. 17, 2017

(54) SUSPENSION STRUCTURE FOR VEHICLE

(71) Applicant: Nissan Motor Co., Ltd., Yokohama-shi, Kanagawa (JP)

(72) Inventors: Shingo Donkai, Kanagawa (JP); Akira Yamaguchi, Kanagawa (JP); Tomoyuki Nakao, Kanagawa (JP); Yoshihiro Konno, Kanagawa (JP); Kuniaki Ozono, Kanagawa (JP); Naoki Shimizu, Kanagawa (JP)

(73) Assignee: Nissan Motor Co., Ltd, Yokohama (JP)

( * ) Notice: Subject to any disclaimer, the term of this patent is extended or adjusted under 35 U.S.C. 154(b) by 0 days.

(21) Appl. No.: 15/300,746

(22) PCT Filed: Apr. 11, 2014

(86) PCT No.: PCT/JP2014/060509
§ 371 (c)(1),
(2) Date: Sep. 29, 2016

(87) PCT Pub. No.: WO2015/155890
PCT Pub. Date: Oct. 15, 2015

(65) Prior Publication Data
US 2017/0015166 A1 Jan. 19, 2017

(51) Int. Cl.
*B60G 3/06* (2006.01)
*B60G 7/00* (2006.01)
*F16C 11/06* (2006.01)

(52) U.S. Cl.
CPC ............... *B60G 3/06* (2013.01); *B60G 7/001* (2013.01); *B60G 7/005* (2013.01); *F16C 11/06* (2013.01); *B60G 2200/1424* (2013.01); *B60G 2202/312* (2013.01); *B60G 2204/129* (2013.01); *B60G 2204/1431* (2013.01);
(Continued)

(58) Field of Classification Search
CPC . B60G 3/06; B60G 7/00; B60G 7/001; B60G 7/005; B60G 2200/1424; B60G 2202/312; B60G 2204/1431; B60G 2204/416; B60G 2206/016; B60G 2206/017; B60G 2206/10; B60G 2206/122; F16C 11/06; F16C 11/0623
See application file for complete search history.

(56) References Cited

FOREIGN PATENT DOCUMENTS

| JP | 5-76960 U | 10/1993 |
| JP | 2000-71734 A | 3/2000 |

(Continued)

*Primary Examiner* — Barry Gooden, Jr.
(74) *Attorney, Agent, or Firm* — Global IP Counselors, LLP

(57) ABSTRACT

A vehicle suspension structure includes a suspension arm and a ball joint. The suspension arm is connected between a suspension member and a vehicle-widthwise outer side end connected to a vehicle wheel. The ball joint connects the suspension arm and the vehicle wheel. When the vehicle receives an impact in the longitudinal direction, a socket of the ball joint pivots relative to a ball as the suspension arm deforms, and a flange portion on an open side of the socket interferes with a stud shaft of the ball joint. The interference causes the flange portion to deform and the ball to come out of the socket to undo the link with the vehicle wheel by the ball joint. Upon becoming unlinked, the vehicle wheel moves toward the vehicle-widthwise outer side and interference with the rear vehicle body is suppressed to limit deformation of the vehicle body.

15 Claims, 16 Drawing Sheets

(52) U.S. Cl.
CPC .. *B60G 2204/416* (2013.01); *B60G 2206/016* (2013.01); *B60G 2206/122* (2013.01)

(56) References Cited

FOREIGN PATENT DOCUMENTS

| | | |
|---|---|---|
| JP | 2002-362124 A | 12/2002 |
| JP | 2003-146246 A | 5/2003 |
| JP | 2010-269701 A | 12/2010 |
| JP | 2012-6545 A | 1/2012 |
| JP | 2012-236481 A | 12/2012 |
| JP | 2013-35360 A | 2/2013 |

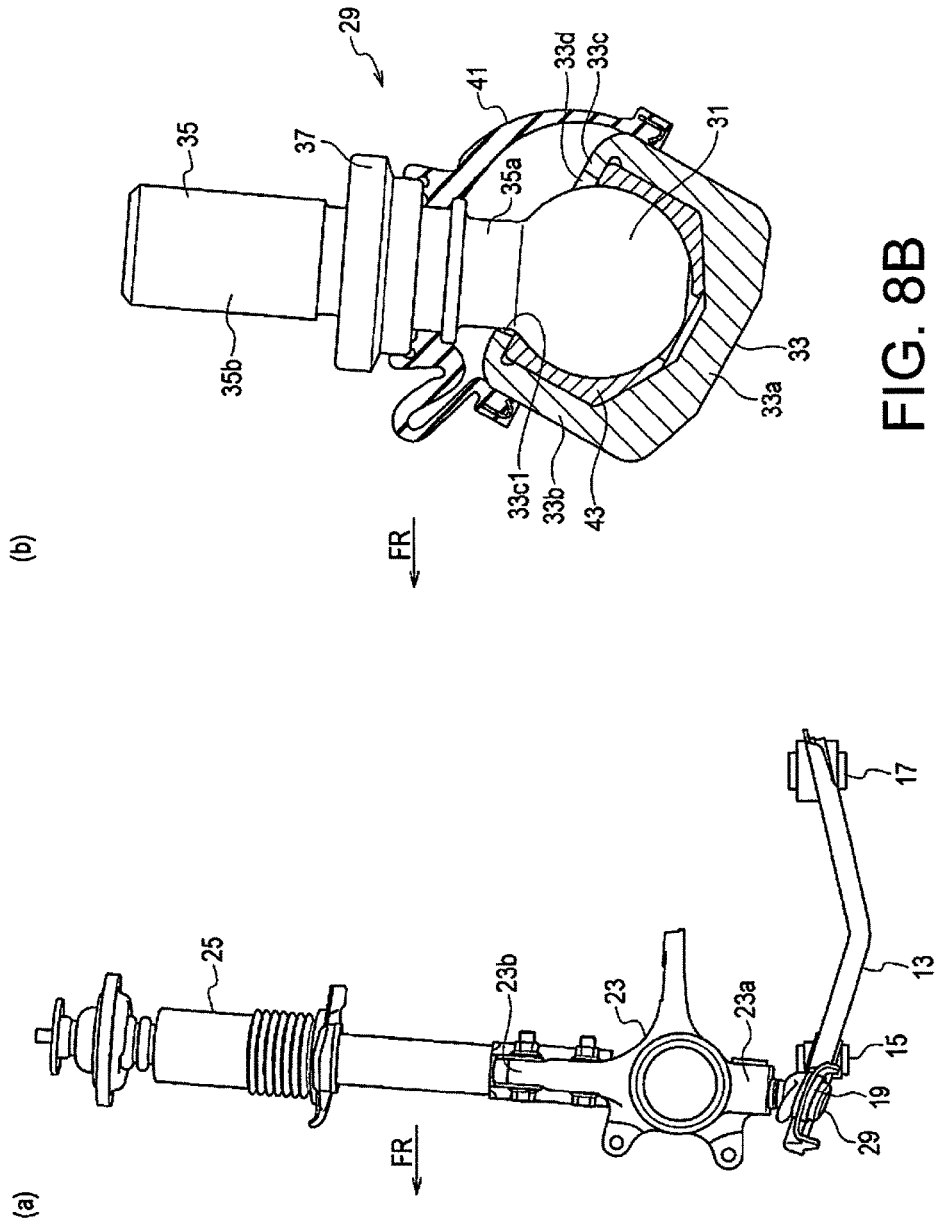

(a)

(b)

(a)

(b)

(c)

(a)

(b)

(c)

(a)  (b)

SUSPENSION STRUCTURE FOR VEHICLE

CROSS-REFERENCE TO RELATED APPLICATIONS

This application is a U.S. National stage application of International Application No. PCT/JP2014/060509, filed Apr. 11, 2014.

BACKGROUND

Field of the Invention

The present invention relates to a suspension structure for a vehicle in which vehicle wheels are supported on a vehicle body via a ball joint.

Background Information

A suspension structure is disclosed in Japanese Laid Open Patent Application No. 2000-71734 (Patent Document 1), described below, for a vehicle that tries to ensure the shock absorbing capability of the vehicle body during a frontal collision of the vehicle. In the suspension structure of the Patent Document 1, a fragile portion is provided to a support a bushing with respect to a suspension cross member that is positioned vehicle-widthwise on the inner side of the suspension arm, and this fragile portion is destroyed at the time of a frontal collision of the vehicle.

SUMMARY

The invention disclosed in the Patent Document 1 is configured to destroy one of two linking parts located in the longitudinal direction of the vehicle body with respect to the suspension cross member of the suspension arm. Consequently, there is the risk that the suspension arm will pivot together with the vehicle wheel about this connected linking part, and thus, the pivoted wheel will interfere with the vehicle body to deform the vehicle body.

Accordingly, an object of the present invention is to suppress deformation of the vehicle body caused by interference of the vehicle wheels when the vehicle receives an impact from the front or rear.

The present invention is characterized in that a suspension arm and a vehicle wheel are linked by a ball joint, and when the vehicle receives an impact from the front or the rear, a spherical housing of the ball joint pivots relative to a sphere as the suspension arm deforms, and an open end of the spherical housing interferes with a shaft portion, causing the sphere to come out of the spherical housing.

According to the present invention, when the vehicle receives an impact in the front or the rear, a spherical housing pivots relative to a sphere as the suspension arm deforms, and an open end of the spherical housing interferes with a shaft portion, causing the sphere to come out of the spherical housing. Since the link between the vehicle wheel and the suspension arm by the ball joint is undone due to the sphere coming out of the spherical housing, it is possible to suppress deformation of the vehicle body caused by the vehicle wheel being continuously sandwiched between an obstacle and the vehicle body.

BRIEF DESCRIPTION OF THE DRAWINGS

FIG. 8A is an operational view illustrating a state in which the suspension arm has undergone bending deformation with respect to FIG. 3B; and FIG. 8B is an operational view illustrating a state in which the socket of the ball joint is pivoting relative to the ball.

FIGS. 10A and 10B are plan views illustrating the relationship of the vehicle-widthwise positions of a rim portion and the side sill in which FIG. 10A illustrates a case in which the outer surface of the rim portion is on an outer side of the side sill; and FIG. 10B illustrates a case in which the outer surface of the rim portion is on an inner side of the side sill.

FIG. 11 B indicates an A arm type; and FIG. 11 C indicates a tension rod type.

FIGS. 14A, B, and C illustrate a seventh embodiment of the present invention in which FIG. 14A is a plan view of the suspension arm.

FIG. 14B is a cross-sectional view corresponding to the cross section B-B of FIG. 14A.

DETAILED DESCRIPTION OF THE EMBODIMENTS

The embodiments of the present invention are described in detail below with reference to the drawings.

First Embodiment

Figure 1:
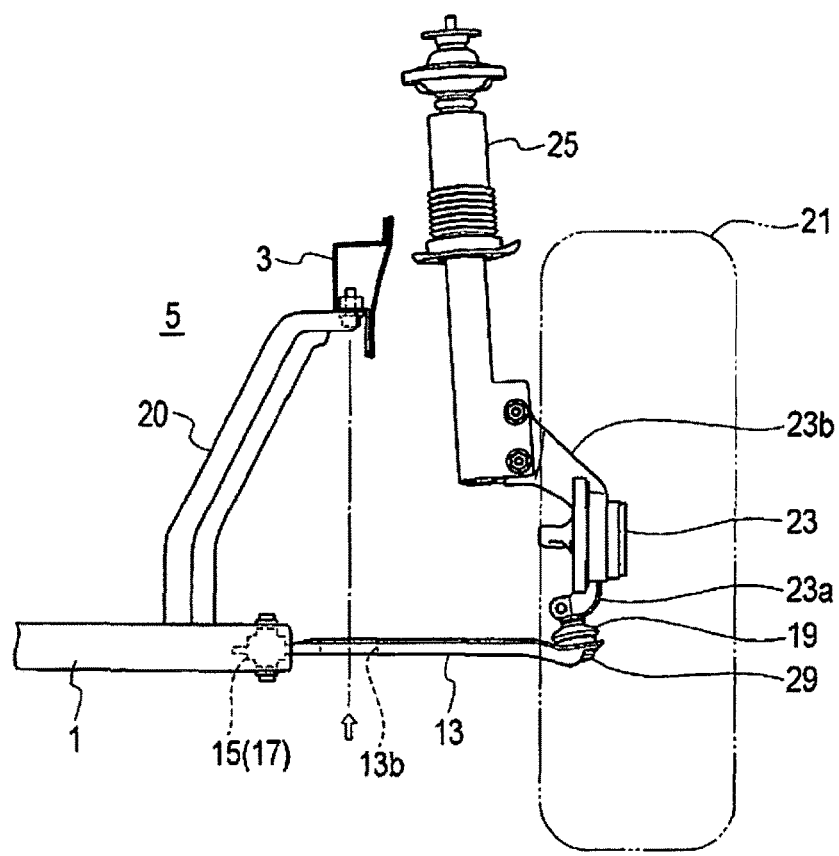
FIG. 1 is a front view as seen on one side of a vehicle in a width direction and illustrating a suspension structure for a vehicle in accordance with a first embodiment of the present invention.

Referring to FIG. 1, a vehicle suspension structure for a vehicle is illustrated according to a first embodiment of the present invention. FIG. 1 shows one lateral side (the left side as seen in the vehicle traveling direction) of the front suspension in the front portion of the vehicle body. The other lateral side is bilaterally symmetrical with respect to the one side in FIG. 1, and is therefore omitted. The direction indicated by the arrow FR in each figure is toward the front of the vehicle.

Figure 2:
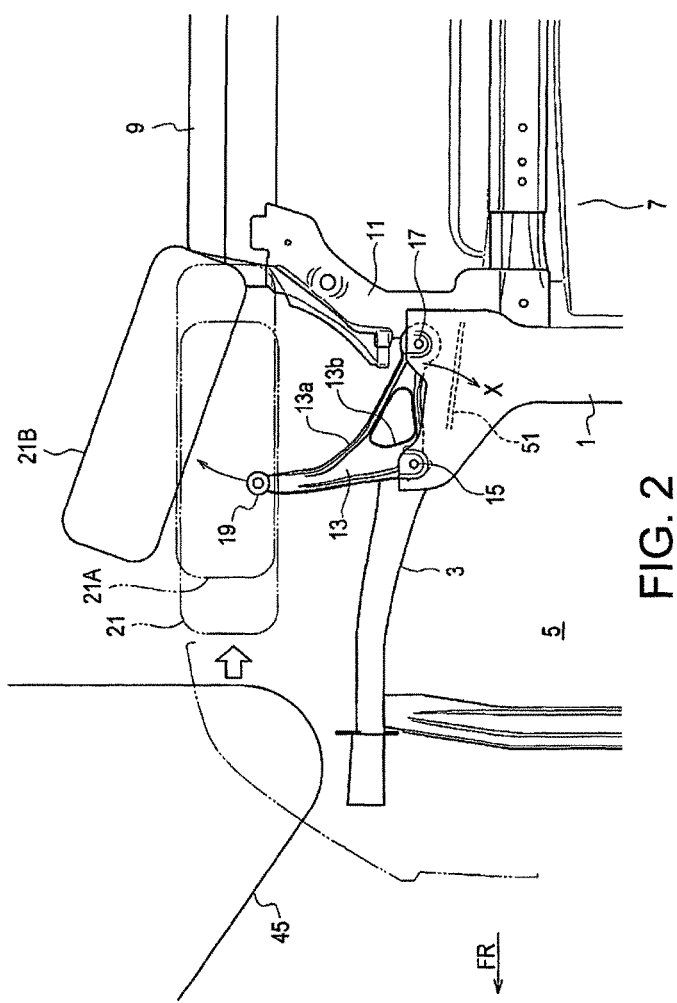
FIG. 2 is a bottom view as seen from under the vehicle and illustrating a state in which the link of the vehicle wheel by the ball joint is undone in the suspension structure of FIG. 1.

The suspension member 1 is disposed so as to extend in the vehicle-width direction (the left and right direction in FIG. 1) and connects the front and rear ends on both vehicle-widthwise sides to a front side member 3 illustrated in FIG. 2, to configure the vehicle body frame member on the lower side of a front compartment 5. The front side member 3 is a vehicle body frame member that extends in the vehicle longitudinal direction on both vehicle-widthwise sides, and the vehicle rear side is bent on the vehicle-widthwise inner side relative to the front side, with the suspension member 1 as the boundary, as illustrated in FIG. 2.

As illustrated in FIG. 2, which is a bottom view of the vehicle, the rearward side of the front side member 3 from the suspension member 1 is attached to the bottom surface of a floor panel 7 (front side of the paper in FIG. 2), and a side sill 9 is attached to the vehicle-widthwise outer side of the floor panel 7. In addition, the front side member 3 and the side sill 9 rearward of the suspension member 1 are linked by an outrigger 11. In FIG. 1, the floor panel 7 and the outrigger 11 are omitted.

A suspension arm 13 is linked to the vehicle-widthwise outer side end of the suspension member 1 by linking parts 15, 17 that are in two locations to the front and rear of the vehicle-widthwise inner side end thereof. Each of the linking parts 15, 17 uses a bushing that has the vertical direction of the vehicle as the axis. A vehicle wheel 21 is linked to the vehicle-widthwise outer side end of the suspension arm 13 via a linking part 19 that has a ball joint 29 described below.

The suspension arm 13 has a substantially triangular shape in plan view seen from the vertical direction of the vehicle, as illustrated in FIG. 2. Here, the linking part 19 with the vehicle wheel 21 is in substantially the same position relative to the front side linking part 15 linking with the suspension member 1, although the vehicle longitudinal direction position is slightly forward. In addition, the linking part 15 is in substantially the same position relative to the linking part 17, although the vehicle-widthwise position is slightly outward. A straight line that connects the linking part 15 and the linking part 19 and a straight line that connects the linking part 15 and the linking part 17 are substantially orthogonal, although the formed angle is somewhat greater than a right angle; therefore, the suspension arm 13 is substantially right triangular in plan view seen from the vertical direction of the vehicle.

Such a suspension arm 13 comprises a curved portion 13a that is curved so that a concave portion with respect to the straight line that connects the two linking parts 19, 17 is formed between the linking part 19 on the vehicle wheel 21 side and the rearward linking part 17 on the suspension member 1 side. Moreover, an opening 13b is formed in the suspension arm 13, mainly between the linking parts 15, 17. The opening 13b is utilized as a working hole when fastening the upper end of a linking member 20, which links between the suspension member 1 and the front side member 3 positioned there above, to the front side member 3 from the lower side of the vehicle.

Figure 3B:
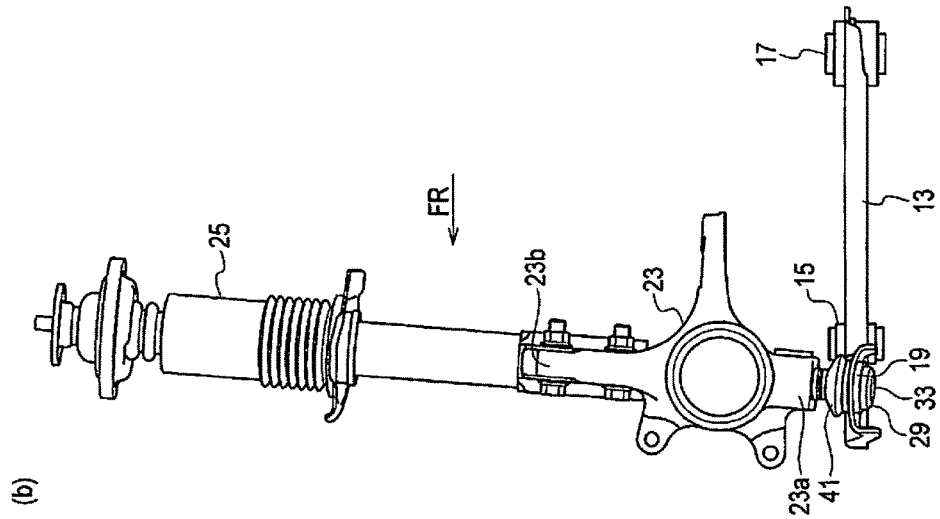
FIG. 3B is a side view of the suspension structure illustrated in FIG. 3A.
Figure 3A:
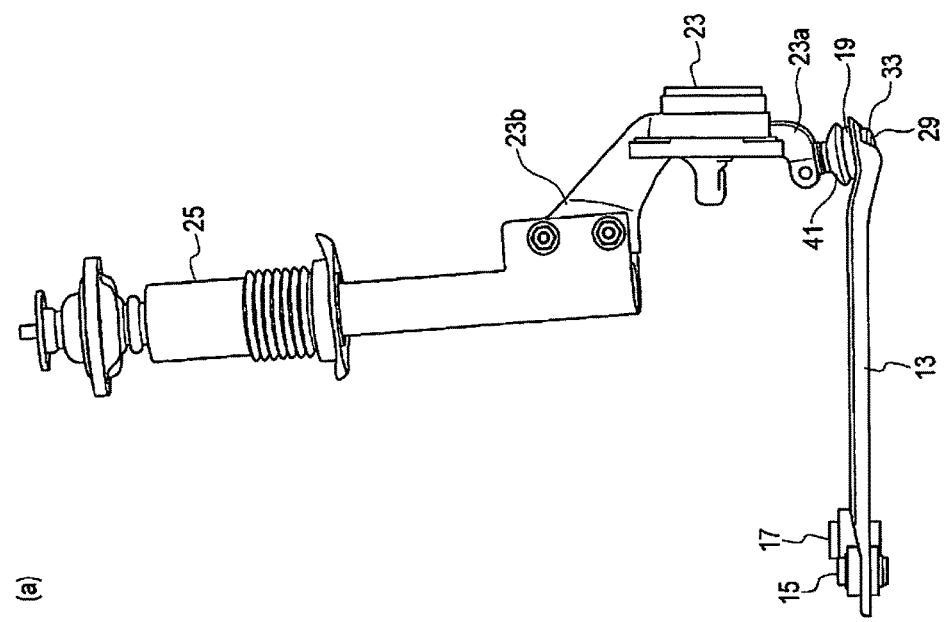
FIG. 3A is a frontal view, similar to FIG. 1, of the suspension structure illustrating a state in which body structure members, such as the suspension member and the vehicle wheels, are omitted from the suspension structure of FIG. 1.

The linking part 19 on the vehicle wheel 21 side of the suspension arm 13 is linked to the bottom 23a of the knuckle (axle) 23, as illustrated in FIG. 1. The top 23b of the knuckle 23 is linked to the bottom end of a shock absorber 25 that configures the strut, and the upper end of the shock absorber 25 is supported to a strut housing, which is not shown, on the vehicle body. The shock absorber 25 is tilted so that the upper end will be on the vehicle-widthwise inner side relative to the lower end, as illustrated in FIG. 3A, and is tilted so that the upper end will be on the rearward side of the vehicle relative to the lower end, as illustrated in FIG. 3B. An axle and a brake rotor, which are not shown, are rotatably connected to the knuckle 23, and a rim portion, which is not shown, on the vehicle wheel 21 is linked and fixed on the brake rotor side. The knuckle 23 and the shock absorber 25 are omitted in FIG. 2.

Figure 4:
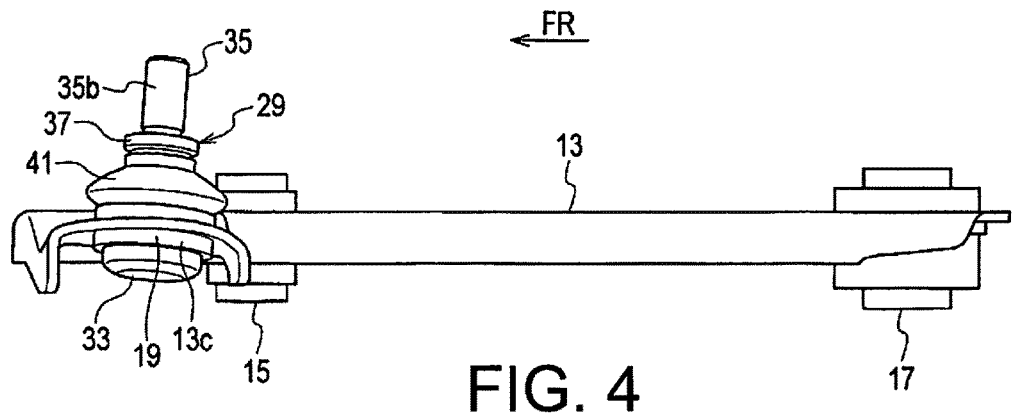
FIG. 4 is a side view illustrating the suspension arm and the ball joint of FIG. 3B.
Figure 5:
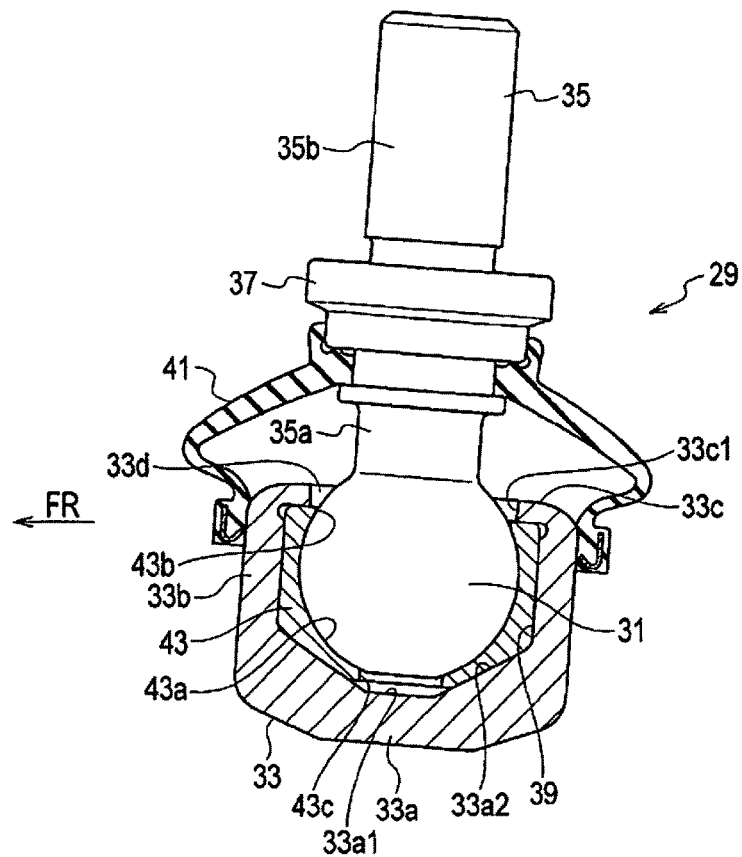
FIG. 5 is a cross-sectional view of the ball joint illustrated in FIG. 4.

As illustrated in FIG. 4 and FIG. 5, the ball joint 29 comprises a ball 31 as the spherical body on the side with the vehicle wheel 21 and a socket 33 as the spherical housing on the side of the suspension arm 13 that rotatably houses ball 31. In addition, a stud shaft 35 is provided above the ball 31 so as to extend outwardly from the socket 33. The stud shaft 35 comprises a lower portion 35a that is continuous with the ball 31 and an upper portion 35b that is linked to the knuckle 23, with a flange 37 located between the lower portion 35a and the upper portion 35b. The diameter of the stud shaft 35 (the lower portion 35a and the upper portion 35b) is smaller than the diameter of the ball 31. Meanwhile, the spherical ball 31 is provided on the side with the suspension arm 13, and the socket 33 as the spherical housing that rotatably houses the ball 31 is provided on the side with the vehicle wheel 21 as well. That is, the ball joint 29 comprises the ball 31 that is on one of the side with the vehicle wheel 21 and the side with the suspension arm 13 side, and a socket 33 that is on the other of the side with the vehicle wheel 21 and the side with the suspension arm 13.

The socket 33 comprises a bottom wall 33a, which becomes the bottom portion, a side wall 33b, which becomes a side portion that rises from the outer peripheral edge of the bottom wall 33a, and a flange portion 33c that protrudes from the upper end of the side wall 33b toward the ball 31. The side wall 33b has a cylindrical shape so as to surround the periphery of the ball 31, which is accompanied by the flange portion 33c being formed in an annular shape so as to surround the periphery of the ball 31.

A ball housing space 39, which becomes the spherical housing space that houses the ball 31, is formed by the bottom wall 33a, the side wall 33b, and the flange portion 33c described above. Here, the diameter of the circle that is formed by the end 33c1 of the annular flange portion 33c is smaller than the diameter of the ball 31. Accordingly, the ball 31 that is housed in the ball housing space 39, as shown in FIG. 5, will not come out of the opening 33d of the ball housing space 39 under normal circumstances. In addition, during normal traveling of the vehicle, the stud shaft 35 will rotatably move relative to the socket 33 about the ball 31, but the end 33c1 of the flange portion 33c will not interfere with the stud shaft 35 (lower portion 35a) at this time.

In order to assemble the ball 31 in the ball housing space 39, for example, the bottom wall 33a of the socket 33 can be formed as a separate member from the side wall 33b, and the stud shaft 35 in a state in which the flange 37 is not attached thereto, can be inserted from the opposite side of the opening 33d, in a state in which the bottom wall 33a is not attached to the side wall 33b. Additionally, a protective cover 41 configured from an elastically deformable rubber, or the like, is attached between the flange 37 and the upper end of the side wall 33b to cover the periphery of the opening 33d.

The bottom wall 33a of the socket 33, in particular the inner surface of the ball housing space 39 side, comprises a planar portion 33a1 in the center and an inclined surface portion 33a2 that is formed around the periphery of the planar portion 33a1. A sliding member 43, formed of resin, or the like, is housed between the socket 33 and the ball 31 in the ball housing space 39.

The sliding member 43 comprises a concave surface 43a that slides relative to the outer surface of the ball 31 and is housed in the ball housing space 39 so that the outer surface is in close contact with the inner surface of the side wall 33b and the inclined surface portion 33a2 of the bottom wall 33a. In addition, the sliding member 43 comprises an opening 43b that corresponds to the opening 33d of the socket 33, and a lower portion opening 43c that is positioned on the opposite side of the opening 43b and that is smaller than the opening 43b.

The ball joint 29 described above is linked to the suspension arm 13 by the socket 33 being inserted and fixed to the annular attaching portion 13c of the suspension arm 13, as illustrated in FIG. 4. On the other hand, the stud shaft 35 is linked to the lower portion 23a of the knuckle 23, and the linking part 19 by the ball joint 29 is configured by the linking of the socket 33 and the stud shaft 35.

Figures 6A, 6B, 6C:
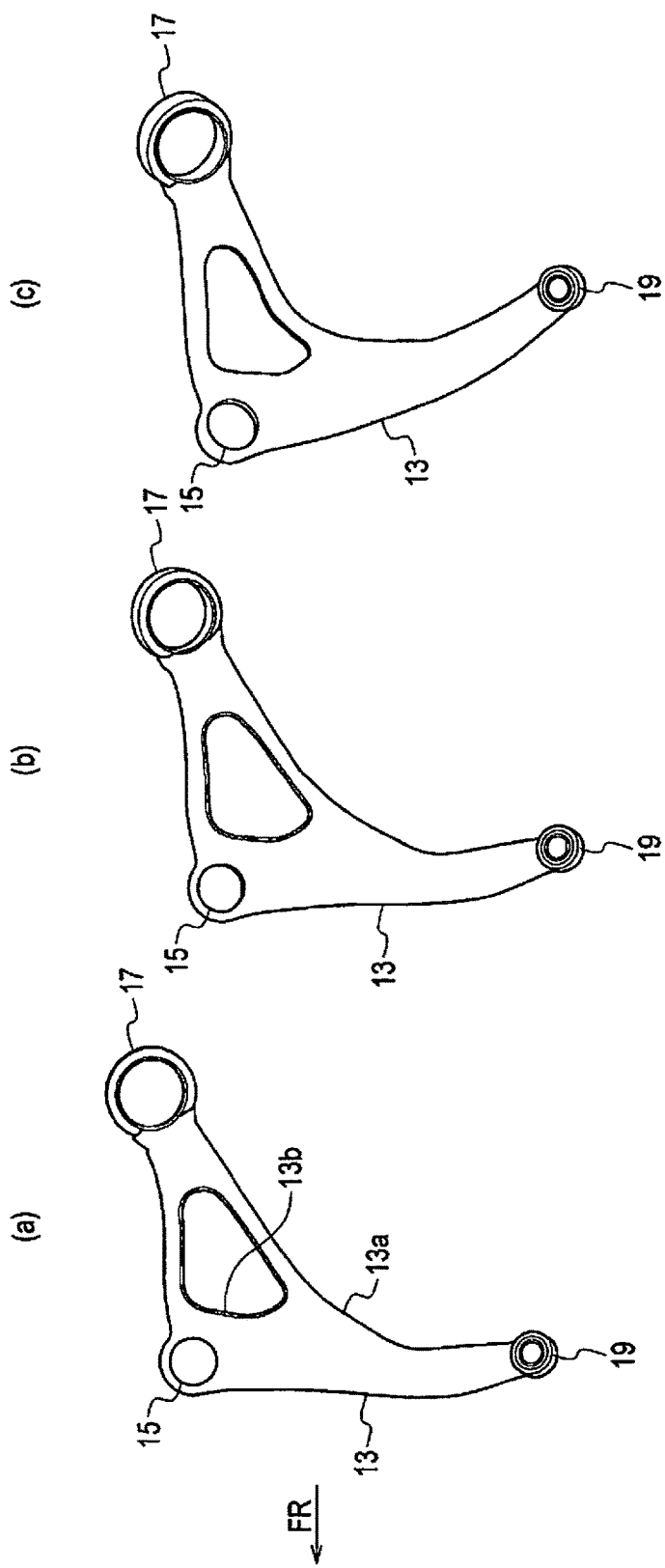
FIGS. 6A, 6B and 6C are plan views illustrating the displacement of the suspension arm illustrated in FIG. 4 undergoing bending deformation, in the order of FIG. 6A, FIG. 6B and FIG. 6C.
Figure 7A:
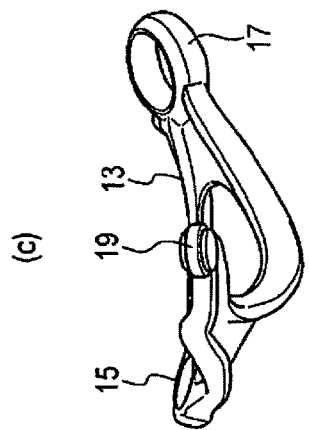
FIGS. 7A, 7B and 7C are side views of the suspension arm that correspond to FIGS. 6A, 6B and 6C.
Figure 7B:
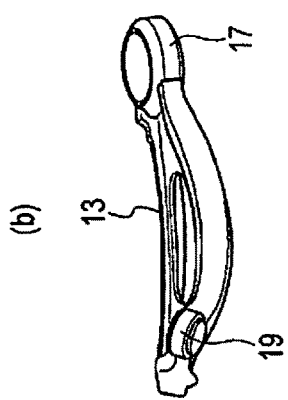

Next, the actions are described. When a vehicle equipped with the suspension structure for a vehicle described above receives an impact in a vehicle longitudinal direction, such as from a frontal collision caused by interference of an obstacle 45, illustrated in FIG. 2, the suspension arm 13 is deformed, as illustrated in, for example, FIG. 6 and FIG. 7. FIG. 6A and FIG. 7A illustrate a state in which the suspension arm 13 begins to deform, and the deformation progresses from this state to the state of FIG. 6B and FIG. 7B, and then to the state of FIG. 6C and FIG. 7C.

Figure 7C:
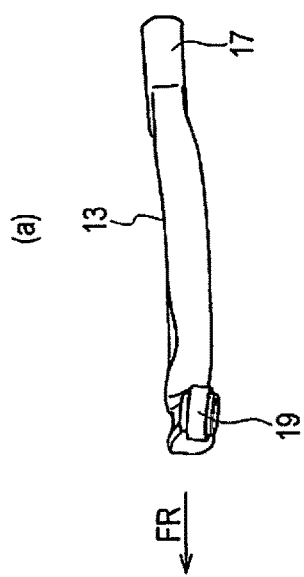

FIG. 8A illustrates a state of the suspension arm 13 after deforming from the state before the deformation shown in FIG. 3B. The suspension arm 13 here is deformed so as to bend and to protrude downwardly. With this deformation, in the ball joint 29, the end 33c1 of the flange portion 33c of the socket 33 on the front side of the vehicle, which becomes the open end, interferes with the lower portion 35a of the stud shaft 35 (corresponding to FIG. 6B and FIG. 7B), as illustrated in FIG. 8B. When the deformation of the suspension arm 13 progresses by further shock being added after the interference, as shown in FIG. 6C and FIG. 7C, the flange portion 33c is deformed and the ball 31 comes out of the socket 33 through the opening 33d. That is, the link between the vehicle wheel 21 and the suspension arm 13 by the ball joint 29 will be undone.

By the above-described deformation of the suspension arm 13 and the releasing of the ball 31 from the socket 33 accompanying this deformation, the vehicle wheel 21 is moved rearward of the vehicle (vehicle wheel 21A) and then moved to the vehicle-widthwise outer side (vehicle wheel 21B), as illustrated in FIG. 2. At this time, there are cases in which the vehicle wheel 21 is linked with the knuckle 23 and the shock absorber 25, but the vehicle wheel is moved to the vehicle-widthwise outer side even if in a linked state. Accordingly, it is possible to suppress the vehicle wheel 21 from being continuously sandwiched between the obstacle 45 and the vehicle body, such as the side sill 9, and it is possible to suppress deformation of the vehicle body by suppressing the interference between the vehicle wheel 21 and the vehicle body as much as possible.

Figure 9A:
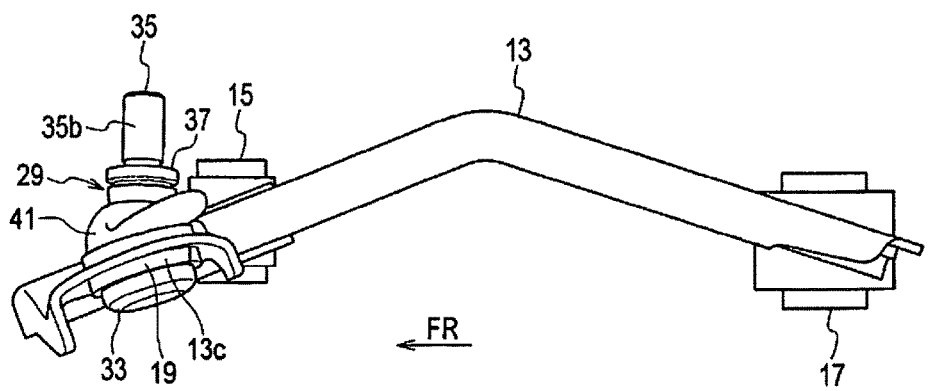
FIG. 9A is an operational view illustrating a state in which the suspension arm is bent so as to protrude upwardly.
Figure 9B:
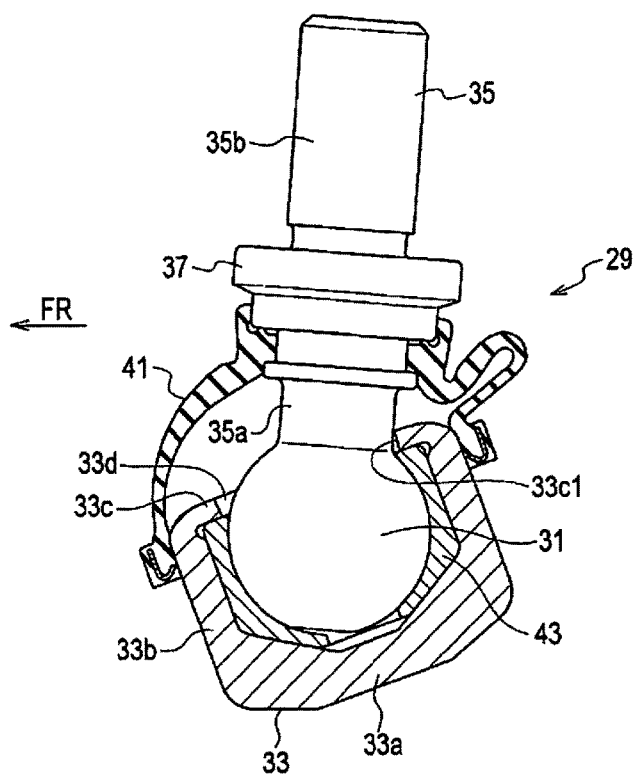
FIG. 9B is an operational view illustrating the state of the ball joint corresponding to FIG. 9A.

In the case where, as illustrated in FIG. 9A, the suspension arm 13 undergoes a bending deformation so as to protrude upwardly in contrast to FIG. 8A, the ball joint 29 becomes as shown in FIG. 9B. In this case, the end 33c1 of the flange portion 33c of the socket 33 on the rearward side of the vehicle, which becomes the open end, interferes with the lower portion 35a of the stud shaft 35.

Figure 10A:
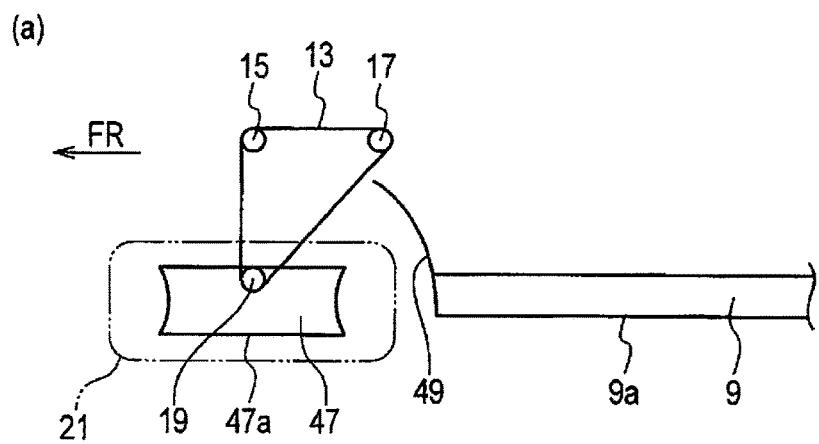

In the present embodiment, a rim surface 47a, which is the vehicle-widthwise outer side surface of a rim portion 47 of the vehicle wheel 21, can be configured to be positioned further on the vehicle-widthwise outer side than the vehicle-widthwise outer side surface 9a of the side sill 9, as illustrated in FIG. 10A. Accordingly, even if the rim portion 47 interferes with the side sill 9 due to the vehicle wheel 21 moving backward, as in the vehicle wheels 21A, 21B of FIG. 2, it is possible to suppress the high-strength rim surface 47a from interfering with the side sill 9, and it is possible to suppress deformation of the vehicle body.

Figure 10B:
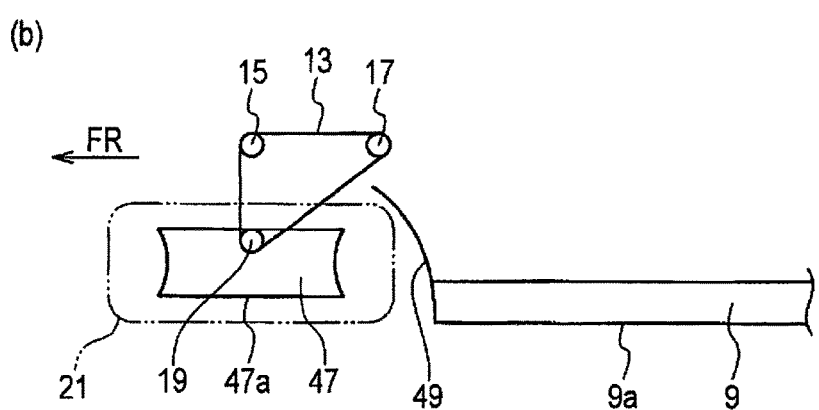

Conversely, if the rim surface 47a of the rim portion 47 is configured to be positioned further on the vehicle-widthwise inner side than the vehicle-widthwise outer side surface 9a of the side sill 9, a guide portion 49 is provided to the vehicle body behind the vehicle wheel 21, as illustrated in FIG. 10B. The guide portion 49 is provided on the inner surface of the wheel housing, curves concavely from the front of the vehicle toward the rear, and connects to the side sill 9.

In this case, even if the particularly high-strength rim surface 47a of the rim portion 47 interferes with the guide portion 49 of the vehicle body due to the vehicle wheel 21 moving backward, as in the vehicle wheels 21A, 21B of FIG. 2, the rim portion 47 (vehicle wheel 21) is guided by the guide portion 49 and moved outwardly. It is thereby possible to suppress the rim portion 47 (vehicle wheel 21) from being continuously sandwiched between the obstacle 45 and the vehicle body, such as the side sill 9, and it is possible to suppress deformation of the vehicle body by suppressing the interference between the vehicle wheel 21 and the vehicle body as much as possible. The guide portion 49 can also be provided in the example of FIG. 10A.

The deformation mode of the suspension arm 13 is such that the distance between the portion that mutually connects the linking parts 15, 19 in the front of the vehicle illustrated in FIG. 6 and the linking part 17 in the rear of the vehicle is bent so as to protrude downwardly, as illustrated in FIG. 8A. When this type of bending mode is schematically illustrated, the line segment a1 of FIG. 11A becomes a broken line.

Figure 11A:
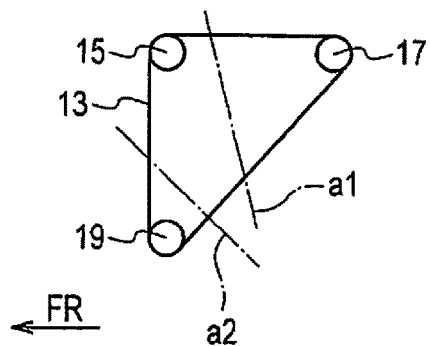
FIGS. 11A, 11B, and 11C are plan views illustrating the positions where the suspension arm is bent by type in which FIG. 11A indicates a compression rod type.

The suspension arm 13 of the present embodiment is a compression rod type, in which the vehicle wheel 21 and the linking part 19 are positioned toward the front side of the vehicle, as illustrated in FIG. 11A, and in this case, there are cases in which the line segment a2 is bent as the broken line. The line segment a2 is a broken line in which the line between the portion that mutually connects the linking parts 15, 17 on the vehicle inner side and the linking part 19 on the vehicle outer side is bent. Line segment a1 and line segment a2 are not limited to the diagrammed positions.

Figure 11B:
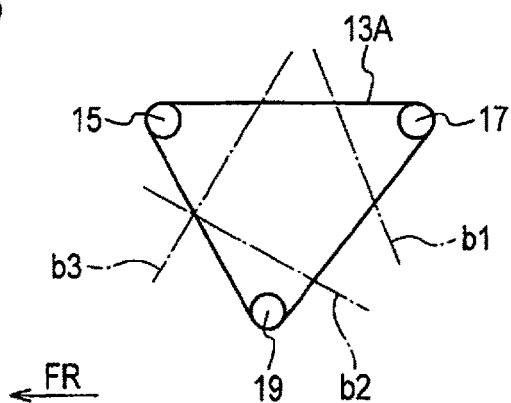

FIG. 11B illustrates an A-arm type of suspension arm 13A in which the linking part 19 with the vehicle wheel 21 is positioned in the center of the other linking parts 15, 17 in the longitudinal direction of the vehicle. In this case, three modes are conceivable, in which line segments b1, b2 and b3 are respectively bent as the broken line. Line segments b1, b2 and b3 are not limited to the diagrammed positions.

Figure 11C:
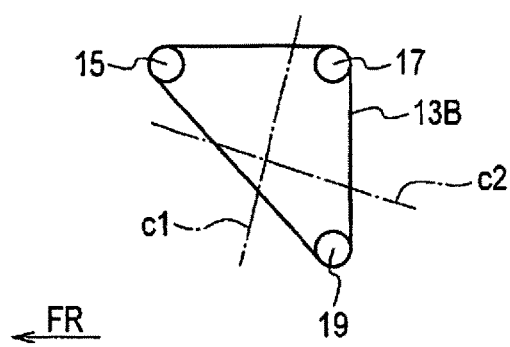

FIG. 11C, in contrast to FIG. 11A, is a tension rod type in which the linking part 19 with the vehicle wheel 21 is positioned toward the rearward side of the vehicle, and in this case, two modes are conceivable, in which line segments c1 and c2 are respectively bent as the broken line. Line segments c1 and c2 are not limited to the diagrammed positions.

In this manner, in the present invention, the suspension arm 13 is linked to the suspension member 1 by linking parts 15, 17 at two locations in the vehicle longitudinal direction, and linked to the vehicle wheel 21 in one location by the linking part 19 of the ball joint 29. The position where the suspension arm 13 is bent is between linking parts in at least two locations from among the three locations of the linking parts.

Accordingly, when the vehicle receives an impact in a longitudinal direction, the suspension arm 13 will be bent between linking parts in at least two locations from among the three locations of linking parts. At this time, the socket 33 pivots relative to the ball 31, and the end 33c1 of the socket 33 interferes with the stud shaft 35, causing the ball 31 to come out of the socket 33. As a result, the link between the vehicle wheel 21 and the suspension arm 13 by the ball joint 29 will be undone. At this time, the vehicle wheel 21 will initially be sandwiched between the obstacle 45 and the vehicle body, such as the side sill 9, but since the link with the suspension arm 13 by the ball joint 29 is undone, it is possible to prevent the vehicle wheel from being continuously sandwiched. Accordingly, it is possible to suppress deformation of the vehicle body by suppressing the interference between the vehicle wheel 21 and the vehicle body as much as possible.

Here, let the breaking load be A, where the linking parts 15, 17 between the suspension arm 13 and the suspension member 1 are broken upon the vehicle receiving an impact in the longitudinal direction. In addition, let the drop-off load be B when the ball 31 of the ball joint 29 comes out of the socket 33 upon the vehicle receiving the impact in the longitudinal direction. At this time, in the present embodiment, the breaking load A when the linking parts 15, 17 are broken shall be greater than the drop-off load B when the ball 31 comes out of the socket 33. That is, "breaking load A>drop-off load B." It is thereby possible to prevent the linking parts 15, 17 from breaking before the ball 31 comes out of the socket 33.

Conversely, when "breaking load A≤drop-off load B," particularly when "breaking load A<drop-off load B," the linking parts 15, 17 will break before the ball 31 comes out of the socket 33. As a result, the socket 33 is less likely to interfere with the stud shaft 35, preventing the ball 31 from coming out of the socket 33. Therefore, by setting the strength and rigidity of the linking parts 15, 17, or of the suspension arm 13 around the linking parts 15, 17, so that "breaking load A>drop-off load B" is satisfied, the suspension arm 13 is more reliably deformed so that the ball 31 more reliably comes out of the socket 33.

Here, the breaking load is indicated by C, where the suspension arm 13 around the linking parts 15, 17 with the suspension member 1 is broken upon the vehicle receiving the impact in the longitudinal direction. At this time, in the present embodiment, the breaking load C of the suspension arm 13 shall be greater than the drop-off load B when the ball 31 comes out of the socket 33. That is, "breaking load C>drop-off load B." It is thereby possible to prevent the suspension arm 13 around the linking parts 15, 17 from breaking before the ball 31 comes out of the socket 33.

Conversely, when "breaking load C≤drop-off load B," particularly when "breaking load C<drop-off load B," the suspension arm 13 around the linking parts 15, 17 will break before the ball 31 comes out of the socket 33, and it becomes difficult for the socket 33 to interfere with the stud shaft 35, preventing the ball 31 from coming out of the socket 33. Therefore, by setting the strength and rigidity of the suspension arm 13 so that "breaking load C>drop-off load B" is satisfied, the suspension arm 13 is more reliably deformed so that the ball 31 more reliably comes out of the socket 33.

Here, let the torsional deformation load be D, where the suspension arm 13 is torsionally deformed by the moment of the force upon the vehicle receiving the impact in the longitudinal direction. In addition, let the drop-off load be E of when the ball 31 of the ball joint 29 comes out of the socket 33 caused by the suspension arm 13 being torsionally deformed by the moment of the force upon the vehicle receiving the impact in the longitudinal direction. At this time, in the present embodiment, the torsional deformation load D of the suspension arm 13 shall be greater than the drop-off load E when the ball 31 comes out of the socket 33. That is, "torsional deformation load D>drop-off load E." It is thereby possible to prevent the suspension arm 13 from undergoing torsional deformation before the ball 31 comes out of the socket 33. Torsional deformation here is a torsional deformation centered on an axis that extends in the vehicle-widthwise direction that connects the linking part 15 and the linking part 19.

Conversely, when "torsional deformation load D≤drop-off load E," particularly when "torsional deformation load D<drop-off load E," the suspension arm 13 will undergo torsional deformation before the ball 31 comes out of the socket 33, and it becomes difficult for the suspension arm 13 to undergo bending deformation. In this case, since the moment of the force is less likely to act on the ball joint 29 due to the suspension arm 13 undergoing torsional deformation first, the ball 31 is less likely to come out of the socket 33. Therefore, by setting the strength and rigidity of the suspension arm 13 so that "torsional deformation load D>drop-off load E" is satisfied, the suspension arm 13 is more reliably subjected to bending deformation so that the ball 31 more reliably comes out of the socket 33.

In addition, in the present embodiment, an opening 13b is formed in the suspension arm 13, and the opening 13b is utilized as a working hole when fastening the upper end of the linking member 20, illustrated in FIG. 1, to the front side member 3 from the lower side of the vehicle, as illustrated in FIG. 2. The suspension arm 13 is configured to be bent so that the socket 33 can more efficiently pivot, utilizing the working hole. It is thereby easier for the ball 31 to come out of the socket 33.

Second Embodiment

Figure 12:
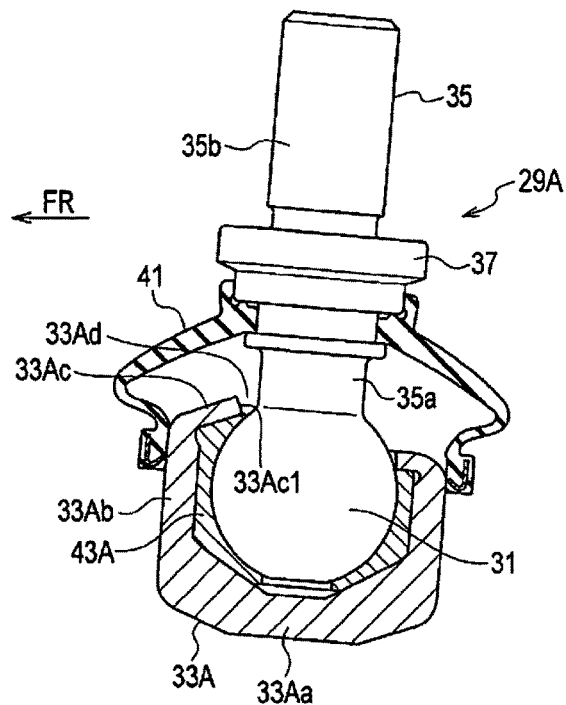
FIG. 12 is a cross-sectional view of the ball joint illustrating a second embodiment of the present invention.

In the second embodiment, as illustrated in FIG. 12, the shape of the socket 33A of the ball joint 29A is different from the socket 33 of the ball joint 29 of the first embodiment illustrated in FIG. 5. Specifically, in the socket 33A, the vertical lengths of the cylindrical side walls 33Ab that rise from the bottom wall 33Aa are different in portions that oppose each other in the vehicle longitudinal direction (the lateral direction in FIG. 12) sandwiching the ball 31 therebetween. In this case, the distances between the end 33Ac1 of the flange portion 33Ac in the socket 33A and the stud shaft 35 in the vehicle longitudinal direction are different in the portions that oppose each other sandwiching the ball 31 therebetween.

In FIG. 12, the left side in the figure is the front of the vehicle; therefore, the length of the rise of the side wall 33Ab on the front side of the vehicle is longer than the length of the rise of the side wall 33Ab on the rearward side of the vehicle. More accurately, the length of the rise of the side wall 33Ab on the front side of the vehicle is longer than the length of the rise of the side wall 33b of the first embodiment, and the length of the rise of the side wall 33Ab on the rearward side of the vehicle is shorter than the length of the rise of the side wall 33b of the first embodiment. In this case, the opening area of the opening 33Ad of the socket 33A is substantially equal to the opening area of the opening 33d of the socket 33 in the first embodiment.

In this manner, the flange portion 33Ac at the upper end of the side wall 33Ab on the front side of the vehicle, the length of the rise of which is longer, is tilted upward, and the end 33Ac1 is in a position that is closer to the lower portion 35a of the stud shaft 35. The side wall 33Ab having such a shape shall be configured so the length of the rise gradually changes between the front side of the vehicle and the rearward side of the vehicle. Other than the sliding member 43A being different from the sliding member 43 of the first embodiment, in correspondence with the shape of the socket 33A, the embodiment is substantially the same as the first embodiment.

In the second embodiment, if the vehicle receives the same impact as in the first embodiment and the suspension arm 13 undergoes the same bending deformation, the end 33Ac1 of the flange portion 33Ac of the socket 33A on the front side of the vehicle interferes with the stud shaft 35 of the ball joint 29A. In this case, compared to the first embodiment, the timing of this interference becomes earlier, corresponding the end 33Ac1 of the flange portion 33Ac of the side wall 33Ab on the front side of the vehicle being closer to the stud shaft 35.

Accordingly, it is possible for the ball 31 of the ball joint 29A to come out of the socket 33A earlier and for the vehicle wheel 21 to be moved to the outer side earlier as well, upon the vehicle receiving the impact in the longitudinal direction, to more reliably suppress deformation of the vehicle body.

The example illustrated in FIG. 12 assumes a case in which the suspension arm 13 is bent so as to protrude downwardly as illustrated in FIG. 8A. By the suspension arm 13 being bent so as to protrude downwardly, the timing at which the end 33Ac1 of the flange portion 33Ac on the front side of the vehicle interferes with the stud shaft 35 of the ball joint 29A becomes earlier.

Therefore, in a case in which the suspension arm 13 is bent so as to protrude upwardly, as in FIG. 9A, the shape of the socket 33A on the front side of the vehicle is the opposite of the shape on the rear side, as illustrated in FIG. 9A. That is, the length of the rise of the side wall 33Ab on the rearward side of the vehicle is longer than the length of the rise of the side wall 33Ab on the front side of the vehicle.

Third Embodiment

Figure 13:
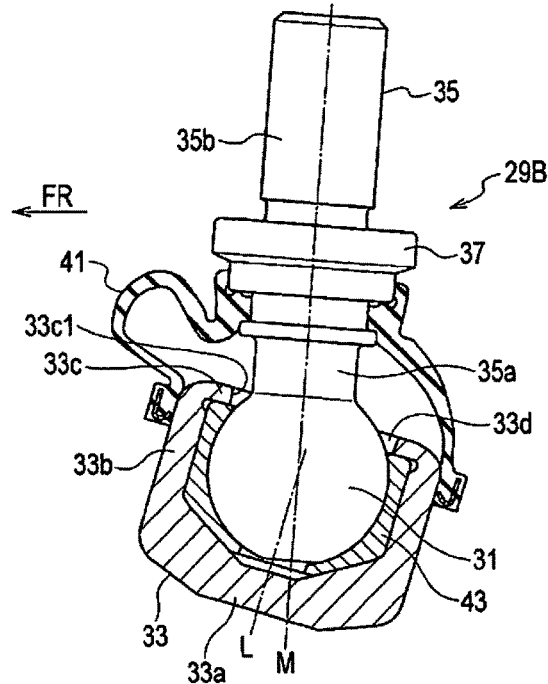
FIG. 13 is a cross-sectional view of the ball joint illustrating a third embodiment of the present invention.

In the third embodiment, the central axis L of the socket 33 of the ball joint 29 is tilted and offset in the clockwise direction in FIG. 13, relative to the central axis M of the stud shaft 35, as illustrated in FIG. 13. In the first embodiment illustrated in FIG. 5, the central axis L and the central axis M are aligned. In this case, the length of the side wall 33b that rises from the bottom wall 33a is uniform along the circumferential direction, in the same way as in the first embodiment, and the shapes of the members of the ball joint 29B are the same as the ball joint 29. The components other than the ball joint 29B are the same as in the first embodiment.

In the third embodiment, the central axis L of the socket 33 is tilted in the clockwise direction in FIG. 13, relative to the central axis M of the stud shaft 35, when assembling the ball joint 29B. Accordingly, the flange portion 33c at the upper end of the side wall 33b on the front side of the vehicle will be in a position that is closer to the lower portion 35a of the stud shaft 35, in the same way as in the second embodiment illustrated in FIG. 12.

In this case, if the vehicle receives the same impact as in the first embodiment and the suspension arm 13 undergoes the same bending deformation, the same effect as the second embodiment can be obtained. That is the timing at which the end 33c1 of the flange portion 33c of the socket 33 interferes with the stud shaft 35 of the ball joint 29B becomes earlier, corresponding to the flange portion 33c of the side wall 33b on the front side of the vehicle being closer to the stud shaft 35.

Accordingly, it is possible for the ball 31 of the ball joint 29B to come out of the socket 33 earlier and for the vehicle wheel 21 to be moved to the outer side earlier as well, upon the vehicle receiving the impact in the longitudinal direction, to more reliably suppress deformation of the vehicle body. Additionally, in the third embodiment, it is not necessary to change the shape of the socket 33 with respect to the first embodiment, as in the second embodiment; therefore, the production cost can be suppressed.

In the third embodiment, the example illustrated in FIG. 13 assumes a case in which the suspension arm 13 is bent so as to protrude downwardly as illustrated in FIG. 8A, in the same way as the second embodiment. By the suspension arm 13 being bent so as to protrude downwardly, the timing at which the end 33c1 of the flange portion 33c on the front side of the vehicle interferes with the stud shaft 35 of the ball joint 29B becomes earlier.

Therefore, in a case in which the suspension arm 13 is bent so as to protrude upwardly, as in FIG. 9A, the inclination direction of the socket 33 relative to the stud shaft 35 becomes the opposite with respect to the example of FIG. 13. That is, the central axis L of the socket 33 relative to the central axis M of the stud shaft 35 is rotated and tilted in the counterclockwise direction in FIG. 13.

Fourth Embodiment

In the fourth embodiment, the strength of the portion of the socket 33 that interferes with the stud shaft 35 of the flange portion 33c in the ball joint 29 of the first embodiment illustrated in FIG. 5 is configured to be higher than the strength of the other portions. That is, when the socket 33 pivots relative to the ball 31, the strength of the flange portion 33c of the upper end of the side wall 33b of the portion that interferes with the stud shaft 35 is higher than the strength of the flange portion 33c of the upper end of the side wall 33b of the other portions. In order to increase the strength, for example, a partial induction hardening may be performed; the shape may be partially changed such as partially increasing the thickness; or a separate member having a higher strength can be provided.

In this case, if the vehicle receives the same impact as in the first embodiment, and the end 33c1 of the flange portion 33c interferes with the stud shaft 35 as illustrated in FIG. 8B, it becomes easy for the socket 33 to swing, due to the principle of leverage, with the high-strength end 33c1 as the fulcrum. Accordingly, the other, low-strength sites are easily deformed, and it becomes easier for the ball 31 to come out of the socket 33.

Therefore, in the fourth embodiment as well, it is possible for the ball 31 of the ball joint 29 to come out of the socket 33 earlier and for the vehicle wheel 21 to be moved to the outer side earlier as well, upon the vehicle receiving the impact in the longitudinal direction, to more reliably suppress deformation of the vehicle body.

Fifth Embodiment

In the fifth embodiment, the deformation load F of when the shock absorber 25 and the knuckle 23 illustrated in FIG. 3 are each deformed upon the vehicle receiving the impact in the longitudinal direction is configured to be greater than the arm deformation load G when the suspension arm 13 is deformed, upon the vehicle receiving the impact in the longitudinal direction. That is, "deformation load F of the knuckle 23 and the shock absorber 25>arm deformation load G."

The suspension arm 13 will, for example, thereby undergo bending deformation so as to protrude downwardly, before the knuckle 23 or the shock absorber 25 is deformed. By the suspension arm 13 being bent, the socket 33 pivots relative to the ball 31, and the flange portion 33c of the socket 33 interferes with the stud shaft 35, causing the ball 31 to come out of the socket 33.

Conversely, when "deformation load F of the knuckle and the shock absorber≤arm deformation load G," particularly when "deformation load F of the knuckle and the shock absorber<arm deformation load G," one of the knuckle 23 and the shock absorber 25 will deform before the ball 31 comes out of the socket 33. In such a case, the bending deformation of the suspension arm 13 is inhibited and the socket 33 is less likely to interfere with the stud shaft 35, which inhibits the ball 31 from coming out of the socket 33. Therefore, by setting the strength and rigidity of the suspension arm 13, knuckle 23 and the shock absorber 25 so that "deformation load F>arm deformation load G" is satisfied, the suspension arm 13 is more reliably subjected to bending deformation so that the ball 31 more reliably comes out of the socket 33.

Sixth Embodiment

In the sixth embodiment, the wheel deformation load H when the rim portion 47 of the vehicle wheel 21 illustrated in FIG. 10 interferes with the obstacle 45 illustrated in FIG. 2 upon the vehicle receiving the impact in the longitudinal direction is configured to be greater than the arm deformation load G of when the suspension arm 13 is deformed, upon the vehicle receiving the impact in the longitudinal direction. That is, "wheel deformation load H>arm deformation load G."

The suspension arm 13 will, for example, thereby undergo bending deformation so as to protrude downwardly, before the rim portion 47 is deformed. By the suspension arm 13 being bent, the socket 33 pivots relative to the ball 31, and the flange portion 33c of the socket 33 interferes with the stud shaft 35, causing the ball 31 to come out of the socket 33.

Conversely, when "wheel deformation load H≤arm deformation load G," particularly when "wheel deformation load H<arm deformation load G," the rim portion 47 will deform before the ball 31 comes out of the socket 33. In such a case, the bending deformation of the suspension arm 13 is inhibited and the socket 33 is less likely to interfere with the stud shaft 35, which inhibits the ball 31 from coming out of the socket 33. Therefore, by setting the strength and rigidity of the rim portion 47 and the suspension arm 13 so that "wheel deformation load H>arm deformation load G" is satisfied, the suspension arm 13 is more reliably subjected to bending deformation so that the ball 31 more reliably comes out of the socket 33.

Seventh Embodiment

Figure 14A:
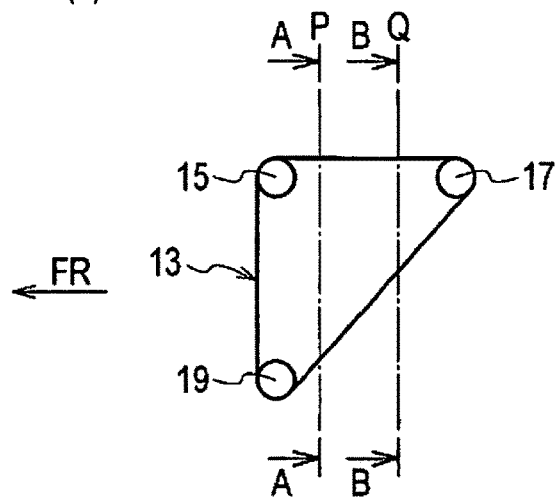

In the seventh embodiment, consideration is given to the shear center of the suspension arm 13 so that the suspension arm 13 will undergo bending deformation in a position that is closer to the ball joint 29 in the vehicle longitudinal direction, upon the vehicle receiving the impact in the longitudinal direction. By the suspension arm 13 being bent at position P, which is closer to the linking part 19 of the ball joint 29 in the vehicle longitudinal direction, it is possible to more efficiently pivot the socket 33, as illustrated in FIG. 14A.

Figure 14B:
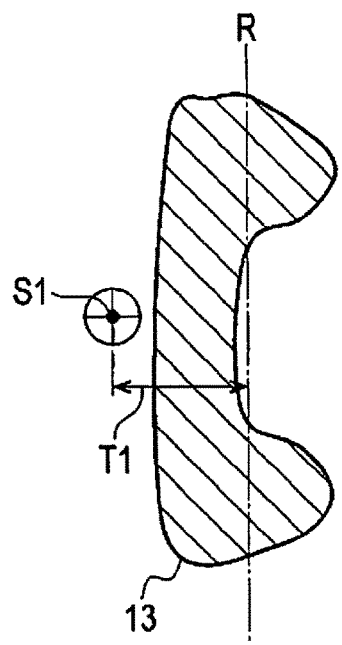
FIG. 14B is a cross-sectional view taken along line A-A of FIG. 14A.
Figure 14C:
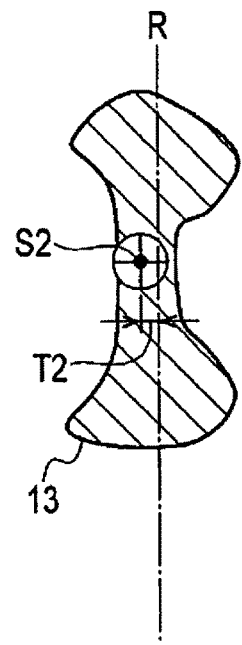
FIG. 14C is a cross-sectional view taken along line B-B of FIG. 14 A.

FIG. 14B is a cross-sectional view of the suspension arm 13 at a position P, which is closer to the linking part 19 and the linking part 15 positioned on the front side of the vehicle, and FIG. 14C is a cross-sectional view at a position Q, which is closer to the linking part 17 positioned toward the rearward side of the vehicle.

In FIGS. 14B and 14C, the shear centers of when the suspension arm 13 is bent, with the substantially vehicle-widthwise direction as the axis, are respectively indicated by S1 and S2. In addition, a plane that connects the respective centers of the linking part 19 between the suspension arm 13 and the vehicle wheel 21, and of the linking parts 15, 17 between the suspension arm 13 and the suspension member 1 in the vertical direction of the vehicle is indicated by R. Plane R assumes an input point of load that is received by the suspension arm 13, upon the vehicle receiving the impact in the longitudinal direction.

The distances T1, T2 between plane R and shear centers S1, S2 in the vertical direction of the vehicle have the relation T1>T2, as illustrated in FIGS. 14B and 14C. That is, the distance T1 between the shear center S1 and plane R on the side closer to the linking part 19 of the ball joint 29 in the vehicle longitudinal direction is greater than the distance T2 between the shear center S2 and plane R on the side closer to the linking part 17 that is on the side farther from the linking part 19. In this case, the position where the distance between plane R and the shear center is greatest is on the side that is closer to the ball joint 29.

In this manner, distances T1 and T2 can be varied by making the shape in the vertical direction of the vehicle asymmetrical across plane R. It can be said that the cross-sectional shape of FIG. 14B is more asymmetrical in the vertical direction of the vehicle with respect to plane R than the cross-sectional shape of FIG. 14C. However, it is not required for the shape to be asymmetrical as described above in order to vary the distances T1, T2; even if the shape is symmetrical in the vertical direction of the vehicle with respect to plane R, the positional relationship between the shear centers S1, S2 and plane R in the vertical direction may be varied.

In the seventh embodiment, the suspension arm 13 will receive load in the vehicle longitudinal direction along plane R, when the vehicle receives an impact from the longitudinal direction. At this time, the suspension arm 13 more easily undergoes bending deformation near a position P that is closer to the ball joint 29 (linking part 19), where the above-described distance T1 is wide. Conversely, bending deformation is less likely to occur at a position Q that is closer to the linking part 17 positioned on the rearward side of the vehicle.

In this case, since the suspension arm 13 undergoes bending deformation near a position P that is closer to the ball joint 29 (linking part 19), it is possible to pivot the socket 33 relative to the ball 31 and to cause the flange portion 33*c* to interfere with the stud shaft 35, with a smaller bending deformation. It is thereby possible to cause the ball 31 to come out of the socket 33 earlier. Conversely, in the case that the suspension arm 13 is bent at a position Q that is closer to the linking part 17 positioned toward the rearward side of the vehicle, the socket 33 is less likely to pivot unless the bending deformation amount is increased.

Eighth Embodiment

Figure 15:
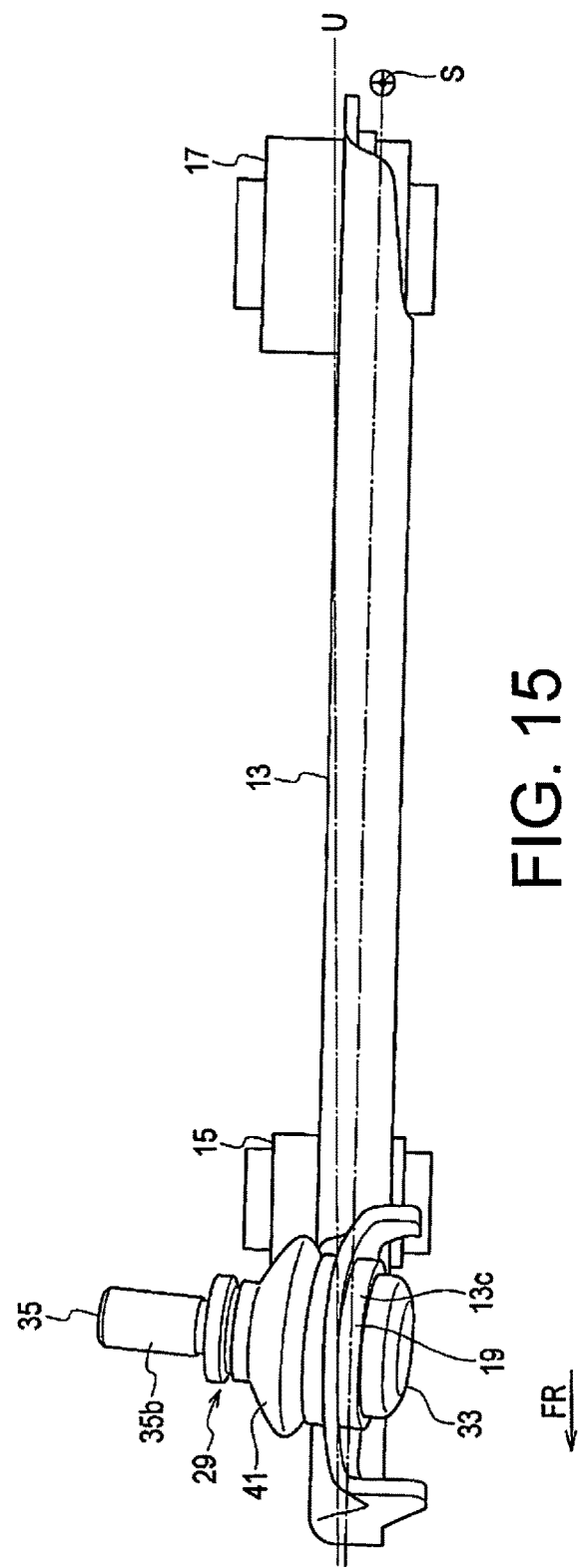
FIG. 15 is a side view illustrating the attachment position of the suspension arm with respect to the suspension member by a bushing according to the eighth embodiment of the present invention.

In the eighth embodiment, the suspension arm 13 is linked, for example, in a vehicle lower side position relative to the central position U of the linking parts 15, 17 by the bushing in the vehicle vertical direction, between the suspension arm 13 and the suspension member 1, as illustrated in FIG. 15. The bushing that is used for the linking parts 15, 17 has the vertical direction of the vehicle as the axis, and the suspension arm 13 is linked to this bushing by press fitting.

Here, the central position U of the linking parts 15, 17 in the vehicle vertical direction (axial center position) U corresponds to plane R illustrated in FIGS. 14B and 14C, that is, the input point of the load that is received by the suspension arm 13. At this time, the shear center S of the suspension arm 13 is in a position that is shifted downwardly relative to the central position U. By shifting the shear center S relative to the central position U that corresponds to plane R, it is possible to specify the bending direction of the suspension arm 13. In the example of FIG. 15, the suspension arm 13 undergoes bending deformation so as to protrude downwardly in the figure.

In this manner, in the eighth embodiment, it is easy to specify the bending direction of the suspension arm 13 by simply shifting, in the vertical direction, the attachment position of the suspension arm 13 relative to the linking parts 15, 17 by the bushing with the suspension member 1. Accordingly, even if there is parts variability in manufacturing, it is possible to stably bend the suspension arm 13 in the same direction, and the detachment of the ball 31 from the socket 33 will also stabilize.

Ninth Embodiment

In the ninth embodiment, when assuming a case in which the suspension arm 13, such as that illustrated in FIG. 14A, is bent at a position P that is closer to the ball joint 29, the bending site shall be continuous along the broken line that extends in the vehicle-widthwise direction.

If the bending site of the suspension arm 13 is not continuous along the broken line that extends in the vehicle-widthwise direction due to, for example, formation of a through-hole, or the like, there is the risk that the suspension arm 13 will break after bending. If the suspension arm 13 is broken, the socket 33 of the ball joint 29 is less likely to pivot, and the end 33*c*1 of the flange portion 33*c* becomes less likely to interfere with the stud shaft 35, causing the ball 31 to be less likely to come out of the socket 333.

Therefore, by the bending site being continuous along the broken line that extends in the vehicle-widthwise direction as in the present embodiment, it is possible to prevent the suspension arm 13 from breaking. Accordingly, the suspension arm 13 more reliably undergoes bending deformation, which is accompanied by the socket 33 pivoting and the end 33*c*1 of the flange portion 33*c* interfering with the stud shaft 35, so that the ball 31 can easily come out of the socket 33.

Tenth Embodiment

Figure 16:
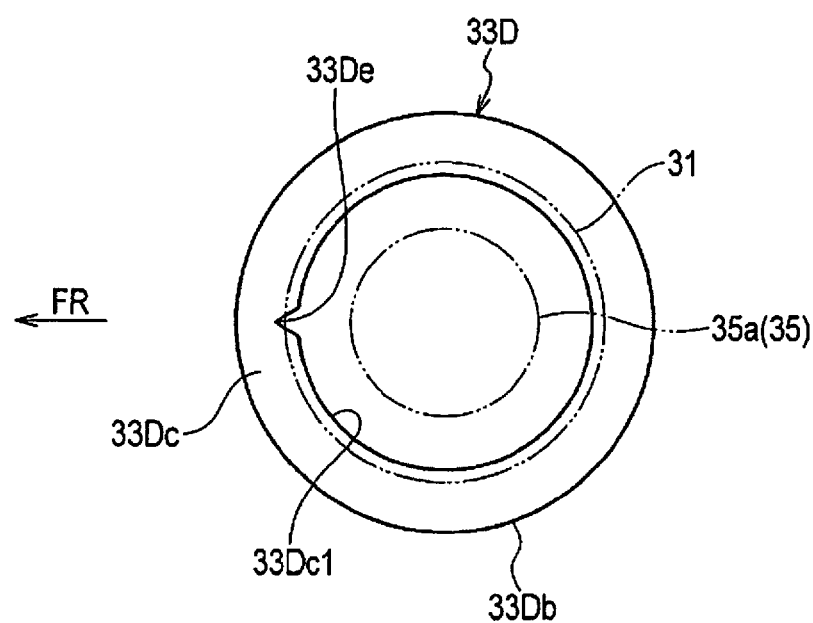
FIG. 16 is a plan view of the socket of the ball joint according to the tenth embodiment of the present invention.

The tenth embodiment is illustrated in FIG. 16. FIG. 16 is a plan view of the socket 33D of the ball joint 29, and the difference from the socket 33 according to the first embodiment illustrated in FIG. 5 is that a notched portion 33D*e* is provided in the end 33D*c*1 of the flange portion 33D*c* on the front side of the vehicle, on the left side in FIG. 16.

By providing a notched portion 33D*e* in the end 33D*c*1 of the flange portion 33D*c*, when the socket 33D (socket 33 in FIG. 8B) pivots and interferes with the lower portion 35*a* of the stud shaft 35, as illustrated in FIG. 8B, it becomes easier for the flange portion 33D*c* to be deformed. With the deformation of the flange portion 33D*c*, the ball 31 can easily come out of the socket 33 with a smaller load.

The example of FIG. 16 is a case in which the suspension arm 13 undergoes bending deformation so as to protrude downward, as illustrated in FIG. 8. Conversely, in a case in which the suspension arm 13 undergoes bending deformation so as to protrude upwardly, a notched portion 33D*e* is provided to the opposite rearward side of the vehicle across the stud shaft 35.

Eleventh Embodiment

Figure 17A:
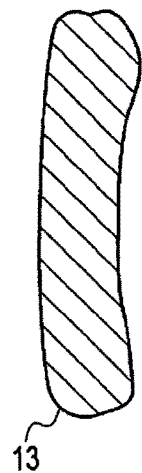
FIGS. 17A and 17B illustrate the eleventh embodiment of the present invention, in which (a) is a cross-sectional view corresponding to the cross section A-A of FIG. 14A.
Figure 17B:
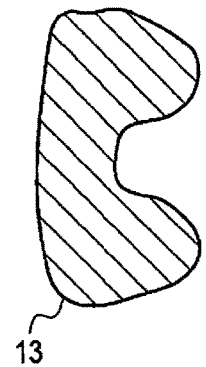

The eleventh embodiment is illustrated in FIG. 17. FIG. 17A corresponds to the A-A cross-sectional view of FIG. 14A, and FIG. 17B corresponds to the B-B cross-sectional view of FIG. 14A. In this case, the section modulus of the suspension arm 13 on the side that is closer to the linking part 19 of the ball joint 29 (FIG. 17A) is configured to be smaller than the section modulus toward the rearward side of the vehicle, on the side away from the linking part 19 (FIG. 17B). The sectional secondary moment may be used instead of the section modulus.

The suspension arm 13 thereby becomes easier to bend near the position P that is closer to the ball joint 29, in the same manner as the seventh embodiment illustrated in FIG. 14. Conversely, the suspension arm becomes less likely to bend in the position Q that is closer to the linking part 17 positioned toward the rearward side of the vehicle. As a result, it is possible to pivot the socket 33 relative to the ball 31, and to cause the flange portion 33*c* of the socket 33 to interfere with the stud shaft 35, causing the ball 31 to come out of the socket 33, with a smaller bending deformation of the suspension arm 13.

Contrary to the present embodiment, if the section modulus is set so that the suspension arm 13 is bent at a position Q that is closer to the linking part 17 toward the rearward side of the vehicle, the suspension arm 13 will bend near the position Q toward the rearward side of the vehicle. In this case, the socket 33 is less likely to pivot, unless the bending deformation amount is increased.

Twelfth Embodiment

Figure 18:
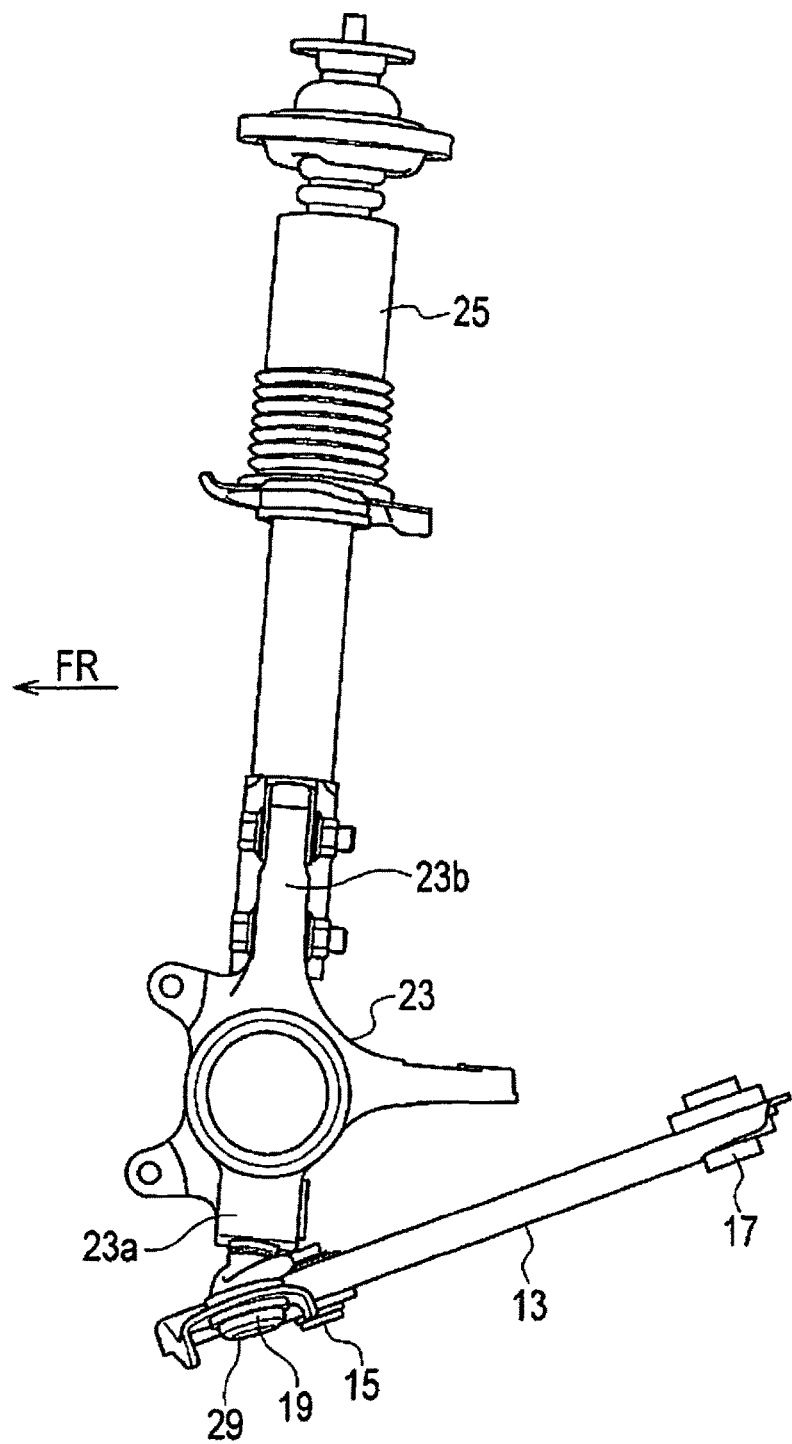
FIG. 18 is a side view corresponding to FIG. 8A of a state in which the suspension arm according to the twelfth embodiment of the present invention is deformed so as to be tilted.

The twelfth embodiment is illustrated in FIG. 18. FIG. 18 illustrates a case in which the suspension arm 13 is deformed so as to be tilted so that the vehicle rearward side is above the front side, with respect to the knuckle 23, when the vehicle receives an impact in the front.

When the vehicle receives an impact in the front, by receiving the load from a part that is housed in the front compartment 5, the suspension member 1 (refer to FIG. 1 and FIG. 2) is deformed so as to be tilted so that the vehicle rearward side is above the front side. Along with this deformation, the suspension arm 13 is deformed so as to be tilted in the same direction as the suspension member 1, as illustrated in FIG. 18. Meanwhile, examples of parts in the front compartment 5 include an engine, a motor, and a transmission.

If the suspension arm 13 is deformed so as to be tilted as illustrated in FIG. 18, the socket 33 of the ball joint 29 attached to the suspension arm 13 is rotated in the counterclockwise direction in FIG. 18 relative to the knuckle 23 (the ball 31 of the ball joint 29). Accordingly, the end 33$c$1 of the flange portion 33$c$ positioned toward the rearward side of the vehicle (right side in FIG. 18) of the socket 33 interferes with the stud shaft 35, and the flange portion 33$c$ is deformed, causing the ball 31 to come out of the socket 33.

Thirteenth Embodiment

The above-described first through twelfth embodiments are configured so that the flange portion 33$c$ of the socket 33 of the ball joint 29 interferes with the stud shaft 35 by the suspension arm 13 undergoing bending deformation causing the ball joint 29 to detach.

In contrast, in the thirteenth embodiment, the strength of the guide portion 49 on the vehicle body side positioned behind the vehicle wheel 21 illustrated in FIG. 10 is increased to the same degree as that of the rim portion 47. Accordingly, when the rim portion 47 is moved to the rearward side of the vehicle and interferes with the guide portion 49 upon the vehicle receiving the impact in the longitudinal direction, the ball 31 comes out of the socket 33 due to the reaction force at the time of the interference, causing the link by the ball joint 29 to be undone.

In this manner, if the link between the vehicle wheel 21 and the suspension arm 13 by the ball joint 29 becomes undone, the vehicle wheel 21 is guided by the guide portion 49 and moved to the vehicle-widthwise outer side, as also described in the first embodiment. It is thereby possible to prevent the rim portion 47 (vehicle wheel 21) from being continuously sandwiched between the obstacle 45 and the vehicle body, such as the side sill 9, and it is possible to suppress deformation of the vehicle body by suppressing the interference between the vehicle wheel 21 and the vehicle body as much as possible.

Fourteenth Embodiment

In the above-described first embodiment, the breaking load A of when the linking parts 15, 17 between the suspension arm 13 and the suspension member 1 are broken upon the vehicle receiving the impact in the longitudinal direction, is configured to be greater than the drop-off load B of when the ball 31 of the ball joint 29 comes out of the socket 33 when receiving a similar impact. In addition, in the first embodiment, the breaking load C of the suspension arm 13 around the linking parts 15, 17 with the suspension member 1 upon the vehicle receiving the impact in the longitudinal direction, is configured to be greater than the drop-off load B of when the ball 31 comes out of the socket 33 when receiving a similar impact.

However, cases can be conceived in which the linking parts 15, 17 are broken before the ball 31 comes out of the socket 33 in the process of the suspension arm 13 undergoing bending deformation. Alternatively, cases can be conceived in which the suspension arm 13 around the linking parts 15, 17 is broken before the ball 31 comes out of the socket 33. The present embodiment is a countermeasure for such cases.

In such a case, for example, if the suspension arm 13 around the linking part 17 toward the rearward side of the vehicle in FIG. 2 is broken earlier, the suspension arm 13 will be rotated and moved in the arrow X direction with the frontward linking part 15 as the fulcrum.

At this time, a protrusion 51 that acts as a stopper is provided on the suspension member 1 so as to inhibit the above-described rotational movement of the suspension arm 13. By stopping the rotational movement of the suspension arm 13, the bending deformation of the suspension arm 13 is continued, and the pivoting of the socket 31 relative to the ball 31 is also continued. As a result, it is possible to cause the flange portion 33$c$ of the socket 33 to interfere with the stud shaft 35, causing the ball 31 to come out of the socket 33.

Furthermore, as another embodiment, a notch can be provided to the outer peripheral edge near the position P that is closer to the linking part 19 of the ball joint 29 of the suspension arm 13 illustrated in FIG. 14A. By providing a notch in one of the outer peripheral edge between the linking parts 15, 17 and the outer peripheral edge between the linking parts 19, 17, the suspension arm 13 is more likely to be bent near the linking part 19, and it becomes easier for the ball 31 to come out of the socket 33.

Embodiments of the present invention were described above, but these embodiments are described in order to facilitate understanding of the present invention, and the present invention is not limited to the embodiments. The technical scope of the present invention is not limited to the specific technical matters disclosed in the above-described embodiments, and includes various modifications, changes, and alternative techniques that can be easily derived therefrom.

For example, the bushing used for the linking parts 15, 17 between the suspension member 1 and the suspension arm 13 illustrated in FIG. 2 may have the vehicle longitudinal direction as the axis, instead of the vehicle vertical direction as the axis. In addition, the basic structure of the suspension is not limited to the structure of the embodiment described above; for example, one in which the suspension arm 13 illustrated in FIG. 1 is configured as a lower arm, and an upper arm is provided there above is possible. Furthermore, the structure of the ball joint itself, such as the socket and the stud shaft in the ball joint, and the attachment structure of the ball joint 29 with respect to the suspension arm 13 and the knuckle 23 are not limited to the above-described embodiments. Furthermore, each embodiment described above can be appropriately used in combination.

The present invention is applied to a suspension structure for a vehicle in which vehicle wheels are supported to a vehicle body via a ball joint.

The invention claimed is:

1. A vehicle suspension structure comprising:
   a suspension arm having a vehicle-widthwise inner side end connected to a suspension member and a vehicle-widthwise outer side end connected to a vehicle wheel; and
   a ball joint connecting the suspension arm and the vehicle wheel, the ball joint comprising a spherical body, a spherical housing accommodating the spherical body, and a shaft portion provided on the spherical body so as to extend outwardly from the spherical housing, the spherical housing being configured to pivot relative to the spherical body as the suspension arm deforms, and the spherical housing having an open end that interferes with the shaft portion causing the spherical body to come out of the spherical housing when the vehicle receives an impact in a longitudinal direction, and the suspension arm and the ball joint being configured such that a breaking load that breaks linking parts between the suspension arm and the suspension member, upon the vehicle receiving the impact in the longitudinal direction, is greater than a drop-off load where the spherical body of the ball joint comes out of the spherical housing upon the vehicle receiving the impact in the longitudinal direction.

2. The vehicle suspension structure according to claim 1, wherein the suspension arm is connected to the suspension member by linking parts at two locations spaced apart in the vehicle longitudinal direction, and linked to the vehicle wheel in one location by a linking part of the ball joint, the spherical housing is configured to pivot relative to the spherical body as the suspension arm bends while the vehicle receives the impact in the longitudinal direction, and the open end of the spherical housing interferes with the shaft portion causing the spherical body to come out of the spherical housing upon the vehicle receiving the impact in the longitudinal direction, the suspension arm is configured to bend at a position between the linking parts in at least two of the locations from among the three locations of the linking parts, the linking part between the suspension arm and the suspension member includes a bushing having a vertical direction of the vehicle as an axis; and the linking part of the suspension arm with respect to the bushing is shifted in an axial direction relative to an axial center of the bushing.

3. The vehicle suspension structure according to claim 1, wherein the suspension arm and the ball joint are configured such that a vehicle-widthwise outer side surface of a rim portion of the vehicle wheel is positioned further on the vehicle-widthwise outer side than the vehicle-widthwise outer side surface of a side sill that is provided extending in the vehicle longitudinal direction on the vehicle-widthwise outer side.

4. The vehicle suspension structure according to claim 1, wherein the suspension arm and the ball joint are configured such that the vehicle wheel is moved in the longitudinal direction relative to the vehicle body by the spherical body coming out of the spherical housing, and a guide portion that moves the moved vehicle wheel toward the vehicle-widthwise outer side is provided on the vehicle body.

5. The vehicle suspension structure according to claim 1, wherein the suspension arm is connected to the suspension member by linking parts at two locations spaced apart in the vehicle longitudinal direction, and linked to the vehicle wheel in one location by a linking part of the ball joint, the spherical housing is configured to pivot relative to the spherical body as the suspension arm bends while the vehicle receives the impact in the longitudinal direction, and the open end of the spherical housing interferes with the shaft portion causing the spherical body to come out of the spherical housing upon the vehicle receiving the impact in the longitudinal direction, the suspension arm is configured to bend at a position between the linking parts in at least two of the locations from among the three locations of the linking parts.

6. A vehicle suspension structure comprising:

a suspension arm having a vehicle-widthwise inner side end connected to a suspension member and a vehicle-widthwise outer side end connected to a vehicle wheel; and a ball joint connecting the suspension arm and the vehicle wheel, the ball joint comprising a spherical body, a spherical housing accommodating the spherical body, and a shaft portion provided on the spherical body so as to extend outwardly from the spherical housing, the spherical housing being configured to pivot relative to the spherical body as the suspension arm deforms, and the spherical housing having an open end that interferes with the shaft portion causing the spherical body to come out of the spherical housing when the vehicle receives an impact in a longitudinal direction, and the ball joint being configured such that a distance in the vehicle longitudinal direction between the open end of the spherical housing and the shaft portion is different in portions that oppose each other sandwiching the spherical body therebetween.

7. The vehicle suspension structure according to claim 6, wherein the spherical housing comprises a bottom portion and a side portion that rises from an outer peripheral edge of the bottom portion; and a length of the side portion that rises from the bottom portion is different in portions that oppose each other sandwiching the spherical body therebetween.

8. The vehicle suspension structure according to claim 6, wherein the spherical housing comprises a bottom portion and a side portion that rises from an outer peripheral edge of the bottom portion;

a length of the side portion that rises from the bottom portion is uniform along a circumferential direction; and a distance between an open end of the spherical housing and the shaft portion is different in portions that oppose each other sandwiching the spherical body therebetween by tilting a central axis of the spherical housing relative to a central axis of the shaft portion.

9. A vehicle suspension structure comprising:

a suspension arm having a vehicle-widthwise inner side end connected to a suspension member and a vehicle-widthwise outer side end connected to a vehicle wheel; and a ball joint connecting the suspension arm and the vehicle wheel, the ball joint comprising a spherical body, a spherical housing accommodating the spherical body, and a shaft portion provided on the spherical body so as to extend outwardly from the spherical housing, the spherical housing being configured to pivot relative to the spherical body as the suspension arm deforms, and the spherical housing having an open end that interferes with the shaft portion causing the spherical body to come out of the spherical housing when the vehicle receives an impact in a longitudinal direction, and the suspension arm and the ball joint being configured such that a breaking load that breaks the suspension arm near linking parts connecting with the suspension member, upon the vehicle receiving the impact in the longitudinal direction, is greater than a drop-off load where the spherical body of the ball joint comes out of the spherical housing upon the vehicle receiving the impact in the longitudinal direction.

10. A vehicle suspension structure comprising:
a suspension arm having a vehicle-widthwise inner side end connected to a suspension member and a vehicle-widthwise outer side end connected to a vehicle wheel; and
a ball joint connecting the suspension arm and the vehicle wheel,
the ball joint comprising a spherical body, a spherical housing accommodating the spherical body, and a shaft portion provided on the spherical body so as to extend outwardly from the spherical housing,
the spherical housing being configured to pivot relative to the spherical body as the suspension arm deforms, and the spherical housing having an open end that interferes with the shaft portion causing the spherical body to come out of the spherical housing when the vehicle receives an impact in a longitudinal direction, and
the suspension arm and the ball joint being configured such that a torsional deformation load that torsionally deforms the suspension arm by a moment of force upon the vehicle receiving the impact in the longitudinal direction, is greater than a drop-off load where the suspension arm receives a moment of force and the spherical body of the ball joint comes out of the spherical housing upon the vehicle receiving the impact in the longitudinal direction.

11. A vehicle suspension structure comprising:
a suspension arm having a vehicle-widthwise inner side end connected to a suspension member and a vehicle-widthwise outer side end connected to a vehicle wheel; and
a ball joint connecting the suspension arm and the vehicle wheel,
the ball joint comprising a spherical body, a spherical housing accommodating the spherical body, and a shaft portion provided on the spherical body so as to extend outwardly from the spherical housing,
the spherical housing being configured to pivot relative to the spherical body as the suspension arm deforms, and the spherical housing having an open end that interferes with the shaft portion causing the spherical body to come out of the spherical housing when the vehicle receives an impact in a longitudinal direction, and
the spherical housing comprising a bottom portion and a side portion that rises from an outer peripheral edge of the bottom portion, such that an upper end of the side portion of the portion that interferes with the shaft portion has a higher strength than the upper end of the side portion of other portions when the spherical housing pivots relative to the spherical body.

12. A vehicle suspension structure comprising:
a suspension arm having a vehicle-widthwise inner side end connected to a suspension member and a vehicle-widthwise outer side end connected to a vehicle wheel; and
a ball joint connecting the suspension arm and the vehicle wheel,
the ball joint comprising a spherical body, a spherical housing accommodating the spherical body, and a shaft portion provided on the spherical body so as to extend outwardly from the spherical housing,
the spherical housing being configured to pivot relative to the spherical body as the suspension arm deforms, and the spherical housing having an open end that interferes with the shaft portion causing the spherical body to come out of the spherical housing when the vehicle receives an impact in a longitudinal direction, and
the ball joint connecting to the vehicle body via an axle and a strut, and the ball joint being configured such that a deformation load occurring when the axle and the strut are each deformed, upon the vehicle receiving the impact in the longitudinal direction, is greater than an arm deformation load where the suspension arm is deformed upon the vehicle receiving the impact in the longitudinal direction.

13. A vehicle suspension structure comprising:
a suspension arm having a vehicle-widthwise inner side end connected to a suspension member and a vehicle-widthwise outer side end connected to a vehicle wheel; and
a ball joint connecting the suspension arm and the vehicle wheel,
the ball joint comprising a spherical body, a spherical housing accommodating the spherical body, and a shaft portion provided on the spherical body so as to extend outwardly from the spherical housing,
the spherical housing being configured to pivot relative to the spherical body as the suspension arm deforms, and the spherical housing having an open end that interferes with the shaft portion causing the spherical body to come out of the spherical housing when the vehicle receives an impact in a longitudinal direction, and
the suspension arm and the ball joint being configured such that a wheel deformation load occurring from a rim portion of the vehicle wheel interfering with an obstacle and deforming upon the vehicle receiving the impact in the longitudinal direction, is greater than an arm deformation load when the suspension arm is deformed upon the vehicle receiving the impact in the longitudinal direction by impacting the obstacle.

14. A vehicle suspension structure comprising:
a suspension arm having a vehicle-widthwise inner side end connected to a suspension member and a vehicle-widthwise outer side end connected to a vehicle wheel; and
a ball joint connecting the suspension arm and the vehicle wheel,
the ball joint comprising a spherical body, a spherical housing accommodating the spherical body, and a shaft portion provided on the spherical body so as to extend outwardly from the spherical housing,
the suspension arm being connected to the suspension member by linking parts at two locations spaced apart in the vehicle longitudinal direction, and linked to the vehicle wheel in one location by a linking part of the ball joint,
the spherical housing being configured to pivot relative to the spherical body as the suspension arm bends and deforms, and the spherical housing having an open end that interferes with the shaft portion causing the spherical body to come out of the spherical housing when the vehicle receives an impact in a longitudinal direction,
the suspension arm being configured to bend at a position between the linking parts in at least two of the locations from among the three locations of the linking parts, the suspension arm having a plane that connects respective vehicle vertical centers of the linking parts, the suspension arm and the ball joint being configured such that a position where a distance in a vertical direction of the vehicle is greatest between the plane and a shear center when the suspension arm is bent, is closer to the linking part of the ball joint than to the linking parts with the suspension member toward the rearward side of the vehicle.

15. A vehicle suspension structure comprising:

a suspension arm having a vehicle-widthwise inner side end connected to a suspension member and a vehicle-widthwise outer side end connected to a vehicle wheel; and a ball joint connecting the suspension arm and the vehicle wheel, the ball joint comprising a spherical body, a spherical housing accommodating the spherical body, and a shaft portion provided on the spherical body so as to extend outwardly from the spherical housing, the suspension arm being connected to the suspension member by linking parts at two locations spaced apart in the vehicle longitudinal direction, and linked to the vehicle wheel in one location by a linking part of the ball joint, the spherical housing being configured to pivot relative to the spherical body as the suspension arm bends and deforms, and the spherical housing having an open end that interferes with the shaft portion causing the spherical body to come out of the spherical housing when the vehicle receives an impact in a longitudinal direction, the suspension arm being configured to bend at a position between the linking parts in at least two of the locations from among the three locations of the linking parts, and upon the vehicle receiving the impact in the longitudinal direction and the suspension arm being bent, the bending site is continuous along a broken line.

\* \* \* \* \*